Figure 1:
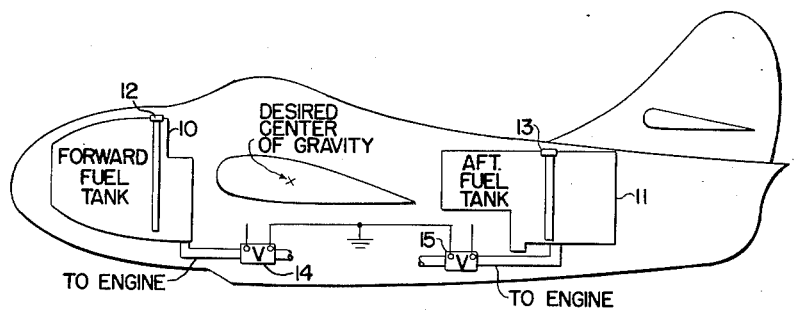

July 3, 1962 A. W. LINDEMANN 3,042,060
CENTER OF GRAVITY CONTROL APPARATUS
Filed Sept. 12, 1956 2 Sheets-Sheet 1

INVENTOR.
ARTHUR W. LINDEMANN

BY

ATTORNEY

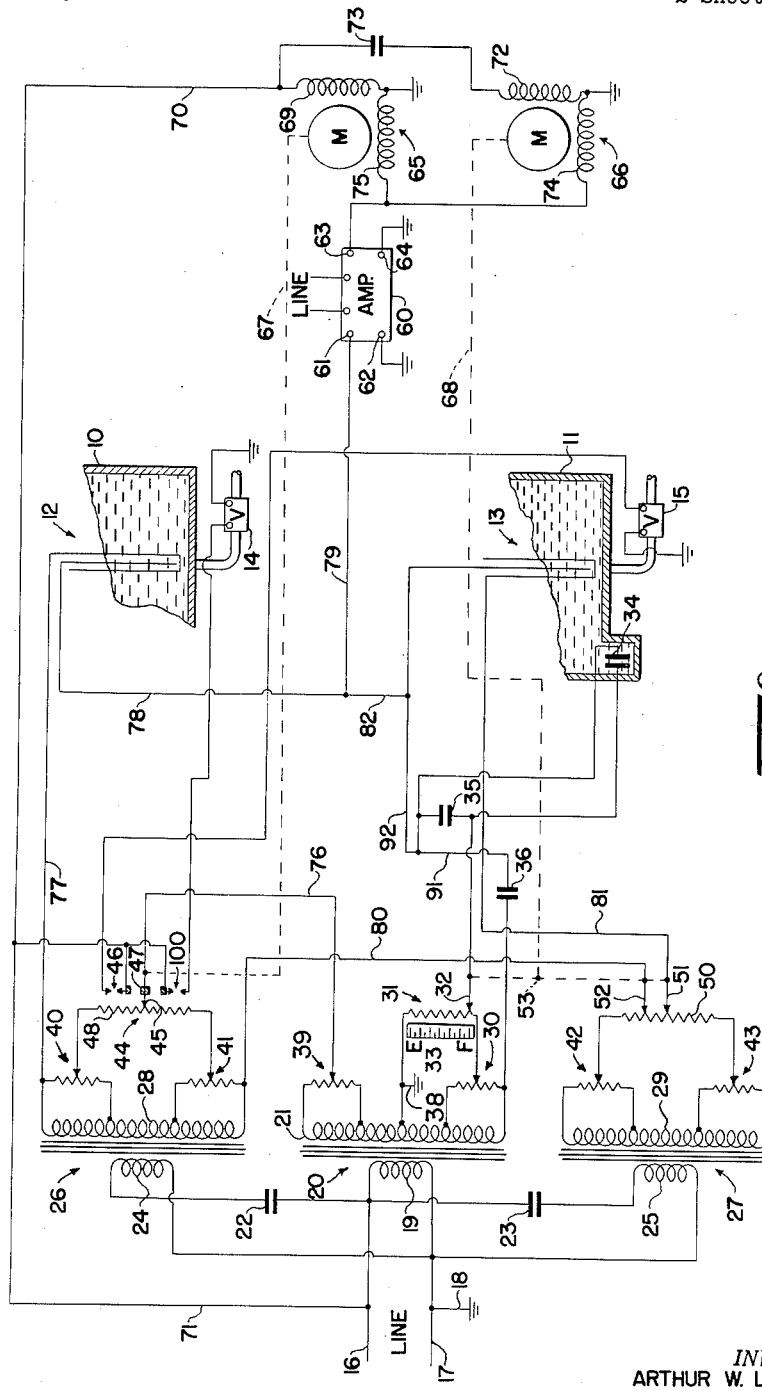

United States Patent Office 3,042,060
Patented July 3, 1962

3,042,060
CENTER OF GRAVITY CONTROL APPARATUS
Arthur W. Lindemann, Columbia Heights, Minn., assignor to Minneapolis-Honeywell Regulator Company, Minneapolis, Minn., a corporation of Delaware
Filed Sept. 12, 1956, Ser. No. 609,401
13 Claims. (Cl. 137—101.25)

The present invention is concerned with control apparatus and more particularly with the control apparatus for use with an aircraft, or other vehicle, to sense the quantity of fuel aboard the aircraft and to sense the center of gravity established by this fuel.

The preferred modification of the present invention is concerned with the fuel systems of aircraft and the control thereof. The accurate quantity measuring of fuel in aircraft is of prime importance since enough fuel must be available for the aircraft to reach a given destination and the carrying of excess fuel reduces the load which can be carried by the aircraft. Accurate measuring of fuel quantity therefore allows a reasonable safety factor for extra fuel for a given flight without unduly burdening the aircraft with extra weight. As is well known, the flight characteristics of the aircraft are controlled to a great extent by the loading of the aircraft, which in turn controls the center of gravity of the craft. Present day aircraft in many cases have fuel tanks located at the extremities of the craft and this fuel therefore has a pronounced effect upon the center of gravity of the aircraft. It therefore becomes desirable to control the rate at which fuel is withdrawn from these tanks to thereby maintain the center of gravity of the craft within a range for best flight characteristics.

It is therefore an object of the present invention to provide a control apparatus which responds to both the quantity of liquid in a plurality of containers and to the center of gravity established by this liquid.

It is a further object of the present invention to provide an improved control apparatus which both indicates the quantity of fuel aboard an aircraft and controls the draining of fuel from the aircraft fuel tanks to thereby control the center of gravity of the aircraft.

Specifically, the present invention makes use of two electrical signals which are of a first and a quadrature phase and of a magnitude which is a function of fuel quantity and center of gravity, with phase sensitive means to respond to one and the other of the signals to indicate fuel quantity and to control the center of gravity.

These and other objects of the present invention will be apparent to those skilled in the art upon reference to the following specification, claims, and drawings, of which:

FIGURE 1 is a silhouette showing of an aircraft showing the placing of a forward and an aft fuel tank, and FIGURE 2 is a schematic showing of the preferred modification of the present invention wherein the fuel quantity aboard the aircraft of FIGURE 1 is measured and the center of gravity of the aircraft of FIGURE 1 is controlled by controlling the withdrawal of fuel from the forward and aft fuel tanks of FIGURE 1.

Referring specifically to FIGURE 1, the reference numerals 10 and 11 designate the forward and aft fuel tanks respectively. The fuel tanks each have an impedance type liquid sensor 12 and 13 mounted therein. The particular type sensor used is a capacitance type sensor which has a capacitance value which varies as a function of the quantity of fuel in the tank. The sensors 12 and 13 may be of the type shown in the Bowar Patent 2,560,757.

Each of the fuel tanks 10 and 11 is provided with an outlet conduit which feeds fuel to the aircraft engines. The reference numerals 14 and 15 designate electrically controlled valves which are located in these outlet conduits. These particular valves are of the type which are open when de-energized. In this manner, a fail safe arrangement is provided since if the supply of electrical power to the valves should fail, both valves will remain open and the fuel in the tanks will be available to the aircraft engines.

The basic design of an aircraft yields a mean aerodynamic chord. For most desirable flight characteristics it is necessary that the center of gravity of the aircraft remain somewhere along this chord. In FIGURE 1 it is desired to control the center of gravity about the point labeled desired center of gravity.

Referring now to FIGURE 2, the forward and aft fuel tanks 10 and 11 are shown with a portion thereof broken away. The outlet conduits and valves are shown and the impedance type sensors 12 and 13 are shown diagrammatically as capacitors having a pair of electrodes between which the fuel in the tanks may enter to provide a dielectric for the capacitor.

Electrical energy is supplied to the apparatus of FIGURE 2 from power line conductors 16 and 17 which are connected to a source of alternating voltage, not shown. Conductor 17 is a grounded conductor, being grounded at connection 18. Power line conductors 16 and 17 are directly connected to the primary winding 19 of a transformer 20 having a secondary winding 21. Power line conductors 16 and 17 are also connected through phase shifting capacitors 22 and 23 to the primary windings 24 and 25 of transformers 26 and 27 respectively.

From the above electrical connections it can be seen that the voltage applied to the three transformer primary windings, and therefore the voltage present in the secondaries thereof, is such that the voltage of secondary 21 and the voltages of secondary windings 28 and 29 are of a quadrature phase relationship.

Transformer secondary winding 21 is utilized in a rebalanceable bridge type fuel quantity measuring network. Secondary winding 21 is provided with a tap which is grounded at connection 38, this being the bridge reference potential. Calibration potentiometers 39 and 30 are connected across upper and lower portions respectively of this secondary winding. The reference numeral 31 designates a rebalance potentiometer having a movable wiper 32 which cooperates with a fuel quantity indicator scale designated by the reference numeral 33. In the apparatus to be described, the relative position of potentiometer wiper 32 and scale 33 indicates the total quantity of fuel in the forward and aft fuel tanks of the aircraft.

The fuel quantity measuring system of FIGURE 2 is a compensated system and a compensation capacitor 34 is provided and is located in a well of aft fuel tank 11 so that its dielectric is the fuel being measured. Compensation capacitor 34 is electrically connected in parallel with a further capacitor 35 and the relative capacitance value of capacitors 34 and 35 determines the percent compensation. The reference numeral 36 designates an empty tank reference capacitor which functions to provide a signal equal and opposite to the signal provided from measuring capacitors 12 and 13 when the fuel tanks 10 and 11 are empty.

The basic operation of the fuel quantity measuring network of FIGURE 2 is such that measuring capacitors 12 and 13 are connected in parallel and located on one side of a bridge network while capacitors 34, 35 and 36 are located on the other side of the bridge network, with the voltage applied to capacitors 34 and 35 being variable to bring the bridge into balance. The operation of such a measuring system is more completely discussed in the copending Richard M. Franzel et al. application Serial No. 200,258 filed December 11, 1950.

Transformer secondary windings 28 and 29 are utilized in a center of gravity responsive system. The reference numerals 40, 41, 42 and 43 designate calibration potentiometers. The reference numeral 44 designates a balance potentiometer having a movable wiper 45 and having switch means 46 and 100 actuated by movement of movable wiper 45. For example, movement of wiper 45 in an upward direction causes the electrical insulator 47 to engage an adjacent insulator and cause switch 46 to close completing an electrical circuit as will be described.

Reference numeral 50 designated a further potentiometer having movable wipers 51 and 52. The spacing between wipers 51 and 52 is preadjusted, by manual means not shown. The relative spacing of the wipers 51 and 52 determines the potential difference between the two wipers for any given position of the wipers along the resistance element of potentiometer 50. As can be ssen from FIGURE 2, the wipers 51 and 52 are mechanically connected together to move as a unit and are also mechanically connected to the potentiometer wiper 32 of the fuel quantity rebalance potentiometer 31.

The resistance element of potentiometer 50 is characterized in accordance with the manner in which the center of gravity of the fuel in the tanks 10 and 11 varies with total fuel quantity. In other words, it can be seen that as the quantity of fuel varies in tanks 10 and 11 the moment arm of this quantity of fuel will vary due to the irregular shape of the tanks. Since the capacitance type sensors 12 and 13 are constructed to yield a capacitance which varies with fuel quantity, it is necessary to correct for changes in the variation in the moment arm of this fuel as the quantity of fuel in the tanks vary. This is the function of potentiometer 50 since it is characterized in a manner to provide a voltage between wipers 51 and 52 which is controlled both by the total quantity of fuel in the tanks, that is the position of wiper 32, and the manner in which the center of gravity of the fuel in the tanks 10 and 11 varies with total fuel quantity, that is the characterization of the resistance element of potentiometer 50. In the event that the fuel tanks, such as tanks 10 and 11, are of uniform cross section and therefore do not have a varying moment arm, the resistance element of potentiometer 50 is a linear resistance.

In some cases, it is also desired to schedule the center of gravity in accordance with total fuel quantity. In this case, such scheduling can be taken into consideration when characterizing the resistance element of potentiometer 50.

It is well known that in certain flights it may be desired to drop a load of one sort or another during flight. This will of course effect the center of gravity of the aircraft and it is possible to compensate for such a change by placing a source of voltage, not shown, in series with wipers 51 and 52 which controls the draining of fuel from the tanks 10 and 11 in a manner to return the center of gravity to the desired position.

The basic operation of the center of gravity apparatus is such that the measuring capacitors 12 and 13 are connected on opposite sides of a bridge network and provide a resultant signal which is a function of the moment unbalance caused by the fuel in the tanks 10 and 11.

The reference numeral 60 designates an amplifier having input terminals 61 and 62 and having output terminals 63 and 64. Amplifier 60 is a conventional linear amplifier, that is, it is an amplifier which amplifies an alternating current signal and provides at the output thereof an amplified reproduction of the signal applied to the input terminals of the amplifier. The output of amplifier 60 is connected to a pair of two phase motors 65 and 66 respectively. Motor 65 has its rotor mechanically connected by means of connection 67 to control the position of potentiometer tap 45 of the center of gravity network, while the rotor of motor 66 is connected by mechanical connections 68 and 53 to control the position of potentiometer wipers 32, 51 and 52. The line voltage winding 69 of motor 65 has its upper terminal connected directly to power line control 16 by means of conductors 70 and 71. The line voltage winding 72 of motor 66 is connected through phase shifting capacitor 73 and conductors 70 and 71 to power line conductor 16. In this manner, motor 66 is responsive to voltages of the power line phase which are applied to its control winding 74 whereas motor 65 is responsive to voltages of a quadrature phase which are applied to its control winding 75.

*Operation*

The operation of the apparatus of FIGURE 2 will now be described. The electrical current flowing through measuring capacitors 12 and 13 to the input of amplifier 60 provide the fuel quantity and center of gravity control signals which cause the motors 65 and 66 to be operated. A main current flow circuit can be traced from ground connection 38 through the upper portion of secondary winding 21, calibration potentiometer 39, and conductor 76 to potentiometer wiper 45. At this point the main circuit has two branches.

A first of these branches extends from potentiometer wiper 45 through the upper portion of the resistance element of potentiometer 44, calibration potentiometer 40, conductor 77, measuring capacitor 12, and conductors 78 and 79 to the input terminal 61 of amplifier 60.

The second circuit branch extends from potentiometer wiper 45 through the lower portion of the resistance element of potentiometer 44, calibration potentiometer 41, conductor 80, potentiometer taps 52 and 51, conductor 81, measuring capacitor 13, and conductors 82 and 79 to the input terminal 61 and amplifier 60. The above traced circuit is completed to ground through the input of the amplifier to input terminal 62.

In the above described circuit, in considering the main circuit and the first circuit branch, the voltage of the upper portion of the transformer secondary winding 21 is in series with the voltage of the upper portion of the transformer secondary winding 28. As before noted, these alternating voltages bear a quadrature relationship due to the manner in which the respective transformer windings are connected to the power line conductors 16 and 17.

Considering now the main circuit and the second circuit branch, the voltage of the upper portion of secondary winding 21 is connected in series with the lower portion of the secondary winding 28. Here again, these two voltages bear a quadrature relationship. However, it will immediately be recognized that the voltage present from potentiometer wiper 45 to the upper terminal of secondary winding 28, that is the voltage in the first circuit branch, is 180° out of phase with the voltage present from potentiometer wiper 45 to the lower terminal of secondary winding 28, that is the voltage in the second circuit branch.

Therefore, the resultant current flowing to the input terminals 61 and 62 of amplifier 60 includes a first component of a phase due to the upper portion of the secondary winding 21 and of a magnitude dependent upon the capacitance of measuring capacitors 12 and 13, which insofar as the upper portion of secondary winding 21 are concerned are connected in parallel. Therefore this first component varies as a function of the total quantity of fuel in tanks 10 and 11. The resultant current in the input of amplifier 60 also contains a second component which bears a quadrature relationship to the above mentioned first component. It is evident from the above traced circuits that the current produced by the first circuit branch opposes the current produced by the second circuit branch. The magnitude of the current in the first circuit branch is controlled by the magnitude of the voltage from potentiometer wiper 45 to the upper terminal of secondary winding 28 in conjunction with the capacitance value of measuring capacitor 12. The magnitude of the current in the second circuit branch is controlled by the magnitude of the voltage from potentiometer wiper 45 to the lower terminal of secondary winding 28, added to the voltage between potentiometer wipers 51 and 52, in conjunction with the capacitance value of measuring capacitor 13.

If the electrical currents in the first and second circuit branch, due to secondary winding 28, are of equal magnitude, no resultant quadrature current flows in the input of amplifier 60. In the event however that these currents are not equal, the second component of current of a quadrature phase, or of a phase displaced 180° from the quadrature phase, flows in the input of amplifier 60.

Amplifier 60 amplifies the above described first and second current components and applies these components to the control windings 75 and 74 of motors 65 and 66 respectively. As is well known, since the line voltage winding 69 of motor 65 is connected directly to the power line conductor 16 and through ground to power line conductor 17, motor 65 responds only to the second component of current. Since the line voltage winding 72 of motor 66 is connected to the power line conductors through a phase shifting capacitor 73, motor 66 responds to the first component of current.

Consider first the operation of motor 65, this motor causes movement of potentiometer tap 45. As the apparatus is shown in FIGURE 2, fuel is being drained from both of the tanks 10 and 11 since the associated valves 14 and 15 are deenergized, the switches 46 and 100 being open. Assume for the moment that a larger quantity of fuel now exists in tank 10 than in tank 11, the electrical current, due to transformer secondary winding 28, which flows in the first circuit branch, that is from potentiometer wiper 45 through measuring capacitor 12, is now greater than that which flows in the second circuit branch. Therefore motor 65 is actuated and rotates in a direction to cause potentiometer wiper 45 to move in an upward direction thereby decreasing the voltage in the first circuit branch while increasing the voltage in the second circuit branch. This upward movement continues until the current flow in the first circuit branch is equal to the current flow in the second circuit branch. In the event that such movement of potentiometer wiper 45 in the upward direction causes switch 46 to close, valve 15 is energized from power line conductors 16 and 17 and therefore fuel no longer is drained from the aft fuel tank 11. This causes the quantity of fuel in the forward tank 10 to be decreased and in a similar manner to that above described, motor 65 is actuated to drive potentiometer wiper 45 in a downward direction, until the point is reached where switch 46 is again open to allow draining of the aft fuel tank 11.

In this manner, it can be seen that motor 65 which is responsive to one phase causes positioning of potentiometer wiper 45 and the resultant control of valves 14 and 15 to automatically control the center of gravity of the aircraft. It is within the teachings of the present invention that an indicator or other means which may not provide automatic control of the center of gravity can be utilized in conjunction with motor 65.

Considering now operation of motor 66, this motor controls the position of potentiometer wipers 32, 51 and 52. As above described, the potential difference between potentiometer wipers 51 and 52 has a magnitude which varies as a predetermined function of the total quantity of fuel aboard the aircraft. The electrical connection of primary winding 25 of transformer 27 is such that the voltage present between wipers 51 and 52 is of the particular phase which at all times aids the voltage existing from potentiometer wiper 45 to the lower terminal of secondary winding 28. In this manner, the operation of the center of gravity motor 65 is modified in accordance with total fuel quantity since operation of motor 66, depending upon the characterization of potentiometer 50, causes a change in the current in the second circuit branch including measuring capacitor 13 and thereby modifies the operation of motor 65 which of course in turn modifies the manner in which valves 14 and 15 are controlled.

The operation of potentiometer wiper 32 by motor 66 causes rebalance of the fuel quantity measuring network. It will be remembered that the input current of amplifier 60 includes a first component which flows due to measuring capacitors 12 and 13 being connected in parallel to the voltage existing between ground connection 38 and the upper portion of secondary winding 21. This first component of current is opposed by a current which flows from ground connection 38 through the lower portion of secondary winding 21, empty tank reference capacitor 36, conductors 91, 92, 82 and 79 to the input terminal 61 of amplifier 60. This first component is also opposed by a current which flows from ground connection 38 through the resistance element of potentiometer 31, potentiometer wiper 32, parallel connected capacitors 34 and 35, and conductors 92, 82 and 79 to the input terminal 61 of amplifier 60. The magnitude of the current flowing in this last traced circuit is controlled by the position of potentiometer wiper 32. It will be remembered that motor 66 is controlled by the above mentioned first current component in the input of amplifier 60 and motor 66 is connected to potentiometer wiper 32 in such a manner that potentiometer wiper 32 is moved in a direction which causes the sum total of the current flowing through capacitors 34, 35 and 36 to be equal to the current flowing through the parallel connected measuring capacitors 12 and 13.

From the above it can be seen that I have provided an improved liquid quantity and center of gravity control apparatus. By the use of means which respond to voltages of different characteristics, an apparatus is provided wherein a single amplifier is utilized in both the fuel quantity network and the center of gravity network, with a resultant saving in weight and cost. The preferred modification of my invention utilizes quadrature phases for the different characteristics of the quantity and center of gravity signals and describes the use of the invention in connection with an aircraft fuel system. These are not to be construed as limiting features of the present invention. It is intended that the present invention be limited solely by the scope of the appended claims.

I claim:

1. A fuel quantity responsive apparatus for use with a vehicle having a first and a second fuel container, comprising: a first and a second fuel responsive impedance device arranged to be located one in each of the fuel containers; a first alternating voltage source; a second alternating voltage source of variable magnitude and of a phase opposite to said first voltage source; a third source of alternating voltage of a phase in quadrature with said first voltage source; a fourth source of alternating voltage of a phase opposite to said third voltage source; circuit means connecting said first and second fuel responsive impedance devices to said first voltage source so as to derive a first and second signal of a first phase and of magnitude indicative of the quantity of fuel in said first and second containers respectively; circuit means connecting said first and second fuel responsive impedance devices to said third and fourth voltage sources so as to derive a third and fourth signal of a second and an opposite phase respectively and of magnitude which varies with the quantity of fuel in said first and second containers respectively; first phase responsive means operable in a first manner by signals of said first phase and in a second manner by signals of the opposite phase to said first phase; circuit means connecting said first and second fuel responsive impedance devices and said second voltage source to said first phase responsive means to apply said first and second signals and a rebalance signal of phase opposite the first phase from said second voltage source thereto; means controlled by said first phase responsive means arranged to control the magnitude of said second voltage source until the rebalance signal therefrom balances said first and second signals; second phase responsive means operable in a first manner by signals of said second phase and in a second manner by signals of the opposite phase to said second phase; and circuit means connecting said first and second fuel responsive impedance devices to said second phase responsive means to apply said third and fourth signals thereto, said second phase responsive means actuated by the difference between said third and fourth signals.

2. Fuel quantity and center of gravity responsive apparatus for use with an aircraft having a pair of fuel tanks comprising: a pair of impedance type fuel sensors located one in each tank; a first source of alternating voltage of a first phase; a second source of alternating voltage of a quadrature phase; a third source of alternating voltage of a phase opposite to the quadrature phase; first circuit means connecting said pair of sensors in parallel to said first source of voltage so that the current flow through said parallel connected pair of sensors is indicative of the fuel quantity in the tanks; second circuit means connecting said pair of sensors to said second and third sources of voltage in a manner to cause a first current to flow through one of said sensors and a second current of phase opposite to the first current to flow through the other of said sensors, the magnitude of each current being indicative of the quantity of fuel in one of the fuel tanks and the resultant of the two currents being indicative of the center of gravity of the fuel in the tanks about some arbitrary axis; and supervisory means connected to said first and second circuit means and having a first output actuated by the current indicative of the fuel quantity and a second output actuated by the current indicative of the center of gravity of the fuel.

3. Liquid quantity and center of gravity responsive apparatus for use with a pair of liquid containers situated on a structure comprising: a pair of impedance type liquid sensors arranged to be positioned one in each container and having an impedance which is a function of the liquid in the containers; a first source of voltage; a second source of voltage of a quadrature phase with respect to said first source of voltage; a third source of voltage of a phase opposite to said quadrature phase; current responsive means having a first portion actuated by currents of a first phase or phase opposite the first phase and a second portion actuated by currents in quadrature with the first phase; circuit means connecting said pair of liquid sensors to said first source of voltage and to said current responsive means to supply a current to said current responsive means of said first phase and of a magnitude which is a function of liquid quantity; and circuit means including said current responsive means connecting one of said liquid sensors to the second voltage source and the other of said liquid sensors to the third voltage source and combining the outputs of said liquid sensors to supply a current to said current responsive means of the phase in quadrature with said first phase which current is a function of the center of gravity established by the liquid in the containers, actuation of the first portion of said current responsive means providing an indication of liquid quantity and actuation of the second portion of said current responsive means providing control of liquid in the containers.

4. Control apparatus for use with a first and second liquid container comprising: a first and a second impedance type liquid quantity sensor arranged to be positioned one in each of the containers; a first source of alternating voltage having a first terminal connected to a reference potential and having a second terminal of a first phase and a third terminal adjustable to vary the magnitude of the voltage thereon and of phase opposite to said first phase; phase responsive means having a first input terminal connected to said reference potential and having a second input terminal; circuit means connecting said impedance type liquid sensors to the second terminal of said first voltage source and to the second terminal of said phase responsive means to present a first signal thereto; a further impedance, circuit means connecting said further impedance to the third terminal of said first voltage source and to the second terminal of said phase responsive means to present a second signal thereto; first means controlled by said phase responsive means in accordance with said first and second signals to adjust the magnitude of the voltage applied to the third terminal of said first voltage source until said second signal balances said first signal; a second source of alternating voltage of quadrature phase to said first phase, a third source of alternating voltage of phase opposite to said quadrature phase; circuit means connecting said first and second liquid sensors to the second and third voltage sources and to the second terminal of said phase responsive means to present a resultant signal to said phase responsive mean; and second means controlled by said phase responsive mean in accordance with the resultant signal.

5. Liquid quantity and center of gravity responsive apparatus for use with a craft having a pair of liquid containers comprising: a pair of capacitance type liquid quantity sensors arranged to be positioned one in each of the liquid containers and having a capacity value indicative of the quantity of liquid in the individual containers; a first source of alternating voltage having a tap connected to a reference potential and having a first and second terminal electrically located on opposite sides respectively of the tap; phase responsive means including an amplifier having a pair of input terminals, one of which is connected to said reference potential; circuit means connecting said capacitance type liquid quantity sensors to the first terminal of said first voltage source and to the other input terminal of said amplifier so that the sum of the signals from the liquid quantity sensors is presented thereto; a further capacitor; circuit means connecting said further capacitor to the second terminal of said first voltage source and to said other input terminal of said amplifier so that a rebalance signal opposing the sum of the currents from the liquid quantity sensors is presented thereto; means including said phase responsive means arranged to control the magnitude of the voltage applied to the second terminal of said first voltage source to thereby control the rebalance signal from said further capacitor to cause this signal to be equal and opposite to the sum of the signals from said liquid sensors; a second source of alternating voltage having a phase in quadrature with the phase of said first source of voltage; a third source of alternating voltage of opposite phase with respect to said second source of alternating voltage; circuit means connecting said first and second liquid sensors to the second and third sources of alternating voltage respectively and to the other input terminal of said amplifier so that the difference of the signals of the quadrature phase from the liquid quantity sensors is presented thereto as an indication of the center of gravity of the liquid in the containers about an arbitrary axis and means including said phase responsive means operable in accordance with the difference of the signals of the quadrature phase.

6. Fuel quantity and center of gravity control apparatus for use with aircraft having a first and a second fuel tank comprising: a first and a second capacitance type fuel quantity sensor arranged to be located one in each of the aircraft fuel tanks; a first source of alternating voltage; a first potentiometer having its resistance element connected across said first source of alternating voltage and having a movable tap; an amplifier having a pair of input terminals one of which is connected to a reference potential; circuit means connecting said liquid quantity sensors one to each end terminal of said first potentiometer resistance element and to the other input terminal of said amplifier to present a first resultant signal thereto which is of a first or an opposite phase and is of magnitude which varies with changes in the center of gravity of the fuel in the tanks about an arbitrary axis; a second source of alternating voltage of quadrature phase with respect to said first source of alternating voltage having a terminal connected to said reference potential and having first and second terminals electrically located on opposite sides of said reference potential; circuit means connecting the movable tap of said first potentiometer to the first terminal of said second voltage source to present a second resultant signal to said amplifier which is of quadrature phase with respect to the first phase and is of magnitude indicative of the total quantity of fuel in the tanks; a second potentiometer having a resistance element connected from said reference potential to the second terminal of said second voltage source and having a movable tap; a further capacitor; circuit means connecting said further capacitor from the movable tap of said second potentiometer to said other input terminal of said amplifier to provide a rebalance signal of opposite phase to said quadrature phase; phase responsive means connected to and controlled by said amplifier and arranged to control said first potentiometer tap in response to signals of the first or opposite phase and to control said second potentiometer tap in response to signals of the quadrature or opposite phase.

7. Apparatus for determining the sum and the difference of two quantities, comprising: a first sensor having an impedance which varies with a first quantity; a second sensor having an impedance which varies with a second quantity; a first source of alternating voltage; a second source of alternating voltage having a phase in quadrature with said first source of alternating voltage; a third source of alternating voltage having a phase in opposition with said second source of alternating voltage; circuit means connecting said first sensor to said first source of alternating voltage to produce a first signal of a first phase and of magnitude indicative of the first quantity; circuit means connecting said second sensor to said first source of alternating voltage to produce a second signal of the first phase and of magnitude indicative of the second quantity; circuit means connecting said first sensor to said second source of alternating voltage to produce a third signal having a second phase which is in quadrature with the first signal and which is of magnitude indicative of the first quantity; circuit means connecting said second sensor to said third source of alternating voltage to produce a fourth signal having a third phase which is in opposition to the second signal and which is of magnitude indicative of the second quantity; conductor means joining all of said circuit means to combine the first, second, third and fourth signals; and phase responsive means connected to said conductor means, said phase responsive means having a first portion responsive to signals of the first phase to provide an output indicative of the sum of the two quantities and a second portion responsive to signals of the second and third phases to provide an output indicative of the difference between the first and second quantity.

8. Control apparatus for use with a structure utilizing first and second liquid containers, comprising: first and second impedance type liquid quantity sensors, one positioned in each of the containers; a first source of alternating voltage having a first terminal connected to a point of reference potential and having a second terminal; phase responsive means having a first input terminal connected to the point of reference potential and having a second input terminal; circuit means connecting said impedance type liquid sensors to the second terminal of said first voltage source and to the second terminal of said phase responsive means to present a first signal to said phase responsive means which is of magnitude indicative of the quantity of liquid in the containers; first means controlled by said phase responsive means in accordance with the first signal; a second source of alternating voltage of quadrature phase with respect to said first source of voltage; a third source of alternating voltage of phase opposite to said second source of voltage; circuit means connecting said first impedance type liquid sensor to said second voltage source and to the second terminal of said phase responsive means to present a second signal to said phase responsive means of magnitude which is variable with the moment of liquid in the first container about an arbitrary axis, circuit means connecting said second impedance type liquid sensor to said third voltage source and to the second terminal of said phase responsive means to present a third signal to said phase responsive means of magnitude which is variable with the moment of liquid in the second container; and second means controlled by said phase responsive means in accordance with the resultant of the second and third signals.

9. Fluid quantity responsive apparatus for use with a first and second container located on either side of an arbitrary axis, comprising: first and second quantity responsive impedance devices one located in each container and each having an impedance which varies with the quantity of fluid therein; a first alternating voltage source; a first circuit including said first voltage source and said first impedance device for producing a first signal of a first phase and of magnitude indicative of the quantity of fluid in the first container; a second circuit including said first voltage source and said second impedance device for producing a second signal of the first phase and of magnitude indicative of the quantity of fluid in the second container; a second alternating voltage source which is in phase quadrature with said first voltage source; a third circuit including said second voltage source and said first impedance device for producing a third signal of a second phase which is in quadrature with the first and second signals, and of magnitude indicative of the quantity of fluid in the first container; a third alternating voltage source which is in phase opposition to said second voltage source; a fourth circuit including said third voltage source and said second impedance device for producing a fourth signal which is of opposite phase to the third signal and is of magnitude indicative of the quantity of the fluid in the second container; signal responsive means having an input and an output; means connecting said first and second circuits to the input of said signal responsive means to present the sum of the first and second signals thereto, the sum being indicative of the total quantity of fluid in the first and second containers; means connecting said third and fourth circuits to the input of said signal responsive means to present the difference between the third and fourth signals thereto, the difference being indicative of the position of the center of gravity of the fluid in the containers with respect to the arbitrary axis; means connected to the output of said signal responsive means responsive to signals of the first or an opposite phase to indicate total fluid quantity; and means connected to the output of said signal responsive means responsive to signals of the second or an opposite phase to control the quantity of fluid in the containers.

10. Center of gravity responsive apparatus located on either side of an arbitary axis comprising: a first sensing device having an impedance which varies with the quantity of fluid in a first container on one side of the arbitrary axis; a second sensing device having an impedance which varies with the quantity of fluid in a second container on the other side of the arbitrary axis; a first source of voltage connected to said first sensing device to derive a first signal of a first phase and of magnitude which varies with the quantity of fluid in the first container; a second source of voltage having a variable magnitude which is characterized in accordance with the moment arms of the fluids in the first and second containers about the arbitrary axis; means operable in accordance with the total quantity of fluid in the first and second containers connected to said second source of voltage to control the magnitude thereof; a third source of voltage connected in series with said second source of voltage to said second sensing device to derive a second signal of phase opposite to the first phase and of magnitude which varies with the quantity of fluid in the second container; signal responsive means having an input and an output; circuit means connecting said first and second sensing devices to the input of said signal responsive means; and means connected to the output of said signal responsive means and operable in accordance with the center of gravity of the fluid in the first and second containers.

11. Center of gravity control apparatus for use with a pair of containers of liquid located on opposite sides of an arbitrary axis; comprising: a first liquid quantity sensing device having an impedance which varies with the quantity of liquid in a first of the containers; a second liquid quantity sensing device having an impedance which varies with the quantity of liquid in the other of the containers; a first source of voltage connected to said first sensing device to produce a signal of first phase and of magnitude which varies with the quantity of liquid in the first container; a second source of voltage having a magnitude which varies with the total quantity of liquid in the containers and which is characterized in accordance with the moment arms of the fluid qunatities in the first and other container; total quantity responsive means connected to said first and second sensing devices and operable in accordance with the total quantity of liquid in the first and other containers; means connecting said total quantity responsive means to control the magnitude of said second source of voltage; a third source of voltage connected to said second source of voltage and to said second sensing device to produce a signal of phase opposite the first phase and of magnitude which varies with the quantity of liquid in the other container; and signal responsive means having an input connected to said first and second sensing devices and having an output which controls the quantity of liquid in the first and other containers in accordance with the center of gravity of the liquid in the containers.

12. Center of gravity apparatus for use with a pair of containers located on either side of an arbitrary axis comprising, in combination: a first quantity sensing device having an impedance which varies with the quantity of a substance in a first container; a second quantity sensing device having an impedance which varies with the quantity of a substance in a second container; a first source of voltage; means connecting said first source of voltage to said first sensing device to produce a first signal of a first phase and of magnitude indicative of the quantity of substance in the first container; means connecting said first source of voltage to said second sensing device to produce a second signal of the first phase and of magnitude indicative of the quantity of substance in the second container; signal responsive means having an input and an output; means connecting said first and second sensing devices to the input of said signal responsive means so that the output of said signal responsive means has a first component which varies with the total quantity of substances in the first and the second containers; a second source of voltage; means connecting said second source of voltage to said first sensing device to produce a third signal which is of quadrature phase with respect to said first phase and is of magnitude which varies with the quantity of substance in the first container; a third source of voltage having a magnitude which is variable and which is characterized in accordance with the moment arms of the substances in the first and second containers about the arbitrary axis; means responsive to the first component connected to the output of said signal responsive means and operable to control the variation of the magnitude of said third source of voltage; means connecting said third source of voltage to said second sensing device to produce a fourth signal of phase opposite the quadrature phase and of magnitude which varies with the quantity of substance in the second container, the difference between the third and fourth signals creating a second component in the output of said signal responsive device; and means responsive to the second component connected to the output of said signal responsive means and operable in accordance with the center of gravity of the substances in the first and second containers.

13. Center of gravity apparatus of the class described for use with a structure comprising, in combination: first and second capacitors each adapted to be mounted in one of a pair of fluid containers attached to the structure so that their capacitance varies with the quantity of fluid in the container; a first voltage source; means connecting said capacitors in parallel to said first voltage source to produce a first resultant signal of a first phase and magnitude indicative of the quantity of fluid in the containers; a second voltage source; a third voltage source, the magnitudes of said second and third voltage sources being chosen so that their ratio is normally the same as the ratio of the distances of the containers to some arbitrary axis representing the desired center of gravity of the fluid; means connecting the first capacitor to the second voltage source to produce a first signal of magnitude which varies with the moment of the fluid in one container about the arbitrary axis; means connecting the second capacitor to said third voltage source to produce a second signal of magnitude which varies with the moment of the fluid in the other of the containers about the arbitrary axis; means combining the first and second signals to produce a second resultant signal of phase in quadrature with the first phase and of magnitude which varies with the center of gravity of the fluid in the containers; and signal responsive means having a first portion responsive only to signals of the first phase and a second portion responsive only to signals of the second phase connected to receive the first and second resultant signals and operable to produce an output in accordance with the resultant signals.

References Cited in the file of this patent

UNITED STATES PATENTS

| | | |
|---|---|---|
| 2,672,880 | Hermanson | Mar. 23, 1954 |
| 2,793,524 | Bancroft | May 28, 1957 |
| 2,838,928 | Bergeson | June 17, 1958 |
| 2,838,933 | Williamson | June 17, 1958 |
| 2,841,164 | Williamson | July 1, 1958 |
| 2,873,757 | Lindemann | Feb. 17, 1959 |
| 2,879,782 | Levine | Mar. 31, 1959 |
| 2,884,948 | Weiss | May 5, 1959 |

OTHER REFERENCES

Article; Modern Aircraft Fuel Gaging, by Solarz, in Aero Digest, September 1952, Fig. 13 (Balancing Controls).